Patented May 4, 1954

2,677,662

UNITED STATES PATENT OFFICE 2,677,662

LUBRICATING OIL ADDITIVES

Louis A. Mikeska and Samuel B. Lippincott, Westfield, N. J., and Alexander H. Popkin, New York, N. Y., assignors to Standard Oil Development Company, a corporation of Delaware No Drawing. Application August 2, 1948, Serial No. 42,156

5 Claims. (Cl. 252—56)

This invention relates to novel chemical products and to the processes for preparing and using the same. It relates also to oil compositions and the like containing such products. More particularly, it relates to high molecular weight copolymers of maleic acid or its anhydride or chlor maleic acid or its anhydride with other unsaturated alkyl compounds and their derivatives and to the esters of such copolymers. These novel materials are especially useful for improving the pour point and the viscosity index of lubricating oils and some are good lubricants in their own right.

One object of the present invention is the production of pour depressants of high potency in a wide variety of lubricating oils. Another object is to produce pour depressants having good pour stability under conditions of winter storage. A further object is the production of a lubricating oil additive which not only lowers the pour point but also increases the viscosity index of the oil and is not only a good pour point depressant when used in small amounts but will be an effective pour depressant when used in higher concentrations as a viscosity index improver. Still another object of the invention contemplates the use of these novel esterified copolymers as synthetic lubricating oils.

A copending application filed this date in the name of Samuel B. Lippincott and Louis A. Mikeska entitled "Lubricating Oil Additives" assigned U. S. Serial No. 42,155 now Patent No. 2,615,845 broadly discloses the use of esters of the copolymers of alpha beta unsaturated dibasic acids or their derivatives and olefinic materials as lubricating oil additives. That application is concerned especially with copolymers of ethylene-1,2-dicarboxylic acids and their derivatives and long chain hydrocarbon olefins such as octadecene. The applicants in the present application have found that oxygen derivatives of hydrocarbons containing an olefinic linkage or a vinyl group may be substituted for the high molecular olefins in copolymerization with maleic acid or its derivatives. Esters of the copolymers of the present application make potent pour depressors and viscosity index improvers. With respect to viscosity index improvement, the present products are superior to those produced in accordance with the Lippincott and Mikeska copending application filed this date and referred to above.

Generally, oil soluble linear polymers having long straight side chains are pour depressants if the side chains range from 10 to 20 carbon atoms. A product of the present invention may have side chains supplied from two sources: (1) the alkyl part of the vinyl alkyl oxygen derivatives which is copolymerized with the maleic acid or its derivatives or (2) from the alcohol used to esterify the copolymer.

The alkyl portion of the unsaturated vinyl alkyl oxygen derivative may be composed of any number of carbon atoms from 1 to 30. When the alkyl group is composed of less than 8 carbon atoms, they contribute little or nothing to pour depressing potency of the resulting product. In such cases, the pour depressant characteristics may be supplied by esterification of the copolymer with a high molecular weight alcohol or a mixture of alcohols containing long straight chains up to 24 carbon atoms such as dodecyl, hexadecyl, octadecyl and the like. Branched chain alcohols may also be used. A very suitable commercially available mixed alcohol is a product obtained by hydrogenation of coconut oil. Such a product is sold under the trade name "Lorol" and is a mixture of saturated straight chain alcohols ranging from 10 to 18 carbon atoms having a major proportion of dodecyl alcohol having 12 carbon atoms.

On the other hand, if the alkyl portion of the vinyl alkyl ether has 10 or more carbon atoms in a straight chain, it supplies directly the pour depressing property of the final product and makes possible the use of cheaper alcohols for the esterification step. Indeed, if the proper choice of vinyl alkyl oxygen derivative is made, the copolymer may be esterified with a lower molecular weight alcohol such as methanol and all of the pour depressing properties of the resultant compound may be obtained from the alkyl group of the vinyl alkyl oxygen derivative.

The products of the present invention are prepared as follows. The maleic acid or its derivatives and the vinyl alkyl oxygen derivative are mixed in a suitable reaction vessel equipped with a reflux condenser. Sufficient amount of solvent, such as benzene or chloroform and the like is added to dissolve the reactants and the mixture is heated to refluxing. The solvent should be inert to copolymerization. A polymerization catalyst may or may not be used. Among the catalysts useful for this process are benzoyl peroxide, cumene peroxide, sunlight, ultra violet light, sodium, sodium amalgam and the like. When used, the catalyst is added over a period of 5 hours. Refluxing is continued further. If at any time, the product tends to separate from solution, more solvent may be added. At the end of the polymerization period an excess of an alcohol, such as Lorol B alcohol, an alcohol having an average chain length of 13.5 carbon atoms derived from coconut oil, may be added together with an esterification catalyst. Refluxing is continued, removing the water of esterification continuously, until the reaction is complete. The reaction mixture is then water washed until free of acid and concentrated by heating to 200° C. at 2 mm. pressure. The products are light colored, viscous syrups which are soluble in lubricating oils.

Example 1

A flask was charged with 5 g. of maleic anhydride, 12 g. of vinyl Lorol B ether and 15 ml. of benzene. 0.3 g. of benzoyl peroxide was dissolved in 6 ml. of benzene. The reaction mixture was heated to refluxing, 99° C. There was some evidence of the peroxide catalyst. The catalyst solution was added to the refluxing mixture in six equal portions at hourly intervals. More benzene was also added during the reaction period to keep the mixture homogeneous. Refluxing was continued for an hour after the catalyst addition was completed. 20 g. of Lorol B alcohol and 0.25 g. of p-toluene sulfonic acid monohydrate were added to the solution and the mixture removing the water of esterification. When the esterification step was complete, the mixture was cooled and the solution was washed with water until free of acid. The benzene was removed by distillation and the product concentrated by heating to 200° C. at 1-2 mm. pressure. The residue (28 g.) was a viscous amber colored fluid. It was blended with lubricating oils and the following data were obtained. Test Oil A is a solvent extracted Mid-Continent neutral plus 3½% Pennsylvania Bright Stock having an SAE grade of 10. Test Oil B is a solvent extracted Mid-Continent neutral having an SAE grade of 10. S. O. D. pour stability test is described in the Transaction of the Society of Automotive Engineers, vol. II, No. 1, pp. 34-44.

IN TEST OIL A

| Conc., Percent | A. S. T. M. Pour Point, °F. | S. O. D. Pour Stability, Cycle A, Solid Point, °F. |
|---|---|---|
| 0 | +30 | >+20 |
| 0.05 | +10 | -5 |
| 0.1 | +5 | -5 |
| 0.2 | 0 | -20 |
| 0.25 | -15 | |
| 0.5 | -10 | |
| 1.0 | -15 | |

IN TEST OIL B

| Conc., Percent | A. S. T. M. Pour Pt., °F. | Viscosity at 100° F. | S. S. U. at 210° F. | V. I. |
|---|---|---|---|---|
| 0 | +15 | 152.4 | 44.0 | 113 |
| 0.05 | | | | |
| 0.1 | | | | |
| 0.2 | | | | |
| 0.25 | -10 | | | |
| 0.5 | -10 | 154.2 | 44.9 | 124 |
| 1.0 | -10 | 160.5 | 45.6 | 126 |

Example 2

Example 1 was repeated using vinyl tetradecyl ether in place of the vinyl Lorol B ether. The product was a reddish-brown viscous fluid. It was blended with lubricating oils and the following data were obtained.

IN TEST OIL A

| Conc., Percent | A. S. T. M. Pour Point, °F. | S. O. D. Pour Stability, Cycle A, Solid Point, °F. |
|---|---|---|
| 0 | +30 | <+20 |
| 0.05 | +20 | +5 |
| 0.1 | +20 | +5 |
| 0.2 | 0 | >-20 |
| 0.25 | -10 | |
| 0.5 | -15 | |
| 1.0 | -5 | |

IN TEST OIL B

| Conc., Percent | A. S. T. M. Pour Pt., °F. | Viscosity at 100° F. | S. S. U. at 210° F. | V. I. |
|---|---|---|---|---|
| 0 | +15 | 152.4 | 44.0 | 113 |
| 0.05 | | | | |
| 0.1 | | | | |
| 0.2 | | | | |
| 0.25 | -10 | | | |
| 0.5 | -5 | 158.3 | 44.5 | 119 |
| 1.0 | 0 | 158.7 | 45.3 | 123 |

Example 3

Example 1 was repeated using vinyl decyl ether in place of vinyl Lorol B ether. The product was a reddish-brown viscous fluid. It was blended with lubricating oils and the following data were obtained.

IN TEST OIL A

| Conc., Percent | A. S. T. M. Pour Point, °F. | S. O. D. Pour Stability, Cycle A, Solid Point, °F. |
|---|---|---|
| 0 | +30 | >+20 |
| 0.05 | +30 | -5 |
| 0.1 | +20 | <-20 |
| 0.2 | +10 | <-20 |
| 0.25 | -10 | |
| 0.5 | -15 | |
| 1.0 | -25 | |

IN TEST OIL B

| Conc., Percent | A. S. T. M. Pour Pt., °F. | Viscosity at 100° F. | S. S. U. at 210° F. | V. I. |
|---|---|---|---|---|
| 0 | +15 | 152.4 | 44.0 | 113 |
| 0.05 | | | | |
| 0.1 | | | | |
| 0.2 | | | | |
| 0.25 | -15 | | | |
| 0.5 | -20 | 152.4 | 44.4 | 119 |
| 1.0 | -25 | 156.0 | 44.8 | 120 |

Example 4

Example 1 was repeated using vinyl laurate in place of vinyl Lorol B ether. The product was a very viscous fluid dark amber in color. It was blended with lubricating oils and the following data were obtained.

IN TEST OIL A

| Conc., Percent | A. S. T. M. Pour Point, °F. | S. O. D. Pour Stability, Cycle A, Solid Point, °F. |
|---|---|---|
| 0 | +30 | >+20 |
| 0.05 | +5 | -5 |
| 0.2 | -15 | <-20 |
| 0.25 | -10 | |
| 0.5 | -10 | |
| 1.0 | -20 | |

IN TEST OIL B

| Conc., Percent | A. S. T. M. Pour Pt., °F. | Viscosity at 100° F. | S. S. U. at 210° F. | V. I. |
|---|---|---|---|---|
| 0 | +15 | 152.4 | 44.0 | 113 |
| 0.05 | | | | |
| 0.2 | | | | |
| 0.25 | −10 | | | |
| 0.5 | −10 | 150.6 | 44.1 | 115 |
| 1.0 | −10 | 152.8 | 44.3 | 116 |

*Example 5*

Example 1 was repeated using the vinyl ester of coconut fatty acids in place of vinyl Lorol B ether. The product was similar to that of Example 4. It was blended with lubricating oils and the following data were obtained.

IN TEST OIL A

| Conc., Percent | A. S. T. M. Pour Point, °F. | S. O. D. Pour Stability, Cycle A, Solid Point, °F. |
|---|---|---|
| 0 | +30 | >+20 |
| 0.05 | +30 | +5 |
| 0.1 | +25 | −15 |
| 0.2 | 0 | <−20 |
| 0.25 | −10 | |
| 0.5 | −15 | |
| 1.0 | −20 | |

IN TEST OIL B

| Conc., Percent | A. S. T. M. Pour Pt., °F. | Viscosity at 100° F. | S. S. U. at 210° F. | V. I. |
|---|---|---|---|---|
| 0 | +15 | 152.4 | 44.0 | 113 |
| 0.05 | | | | |
| 0.1 | | | | |
| 0.2 | | | | |
| 0.25 | −15 | | | |
| 0.5 | −15 | 151.5 | 44.2 | 117 |
| 1.0 | −15 | 150.2 | 44.0 | 115 |

*Example 6*

Example 1 was repeated using vinyl myristate in place of vinyl Lorol B ether. The product was similar to that of Example 4. It was blended with lubricating oils and the following data were obtained.

IN TEST OIL A

| Conc., Percent | A. S. T. M. Pour Point, °F. |
|---|---|
| 0 | +30 |
| 0.25 | −0 |
| 0.5 | −10 |
| 1.0 | −10 |

IN TEST OIL B

| Conc., Percent | A. S. T. M. Pour Pt., °F. | Viscosity at 100° F. | S. S. U. at 210° F. | V. I. |
|---|---|---|---|---|
| 0 | +15 | 152.4 | 44.0 | 113 |
| 0.25 | −10 | | | |
| 0.5 | −10 | 150.2 | 44.0 | 116 |
| 1.0 | −5 | 153.3 | 44.2 | 115 |

*Example 7*

Example 1 was repeated using vinyl caproate in place of vinyl Lorol B ether. The product was very similar to that of Example 4. It was blended with lubricating oils and the following data were obtained.

IN TEST OIL A

| Conc., Percent | A. S. T. M. Pour Point, °F. |
|---|---|
| 0 | +30 |
| 0.25 | −10 |
| 0.5 | −10 |
| 1.0 | −10 |

IN TEST OIL B

| Conc., Percent | A. S. T. M. Pour Pt., °F. | Viscosity at 100° F. | S. S. U. at 210° F. | V. I. |
|---|---|---|---|---|
| 0 | +15 | 152.4 | 44.0 | 113 |
| 0.25 | −10 | | | |
| 0.5 | −10 | 149.7 | 44.0 | 114 |
| 1.0 | −10 | 152.0 | 44.3 | 117 |

The present invention is not to be limited by the specific products set forth herein but only by the following claims in which it is desired to claim all novelty inherent in this invention.

It is further within the contemplation of the invention that the copolymers may be neutralized by reacting with an alcohol, a primary or secondary amine or with a metal to obtain an esterified, amidized or imidized product or a metallic salt.

What is claimed is:

1. A lubricating composition consisting essentially of a major proportion of a mineral lubricating oil having combined therein from 0.05 to 10% by weight based on the weight of the total composition of a copolymer of maleic anhydride and a vinyl alkyl ether containing from 10 to 14 carbon atoms in the alkyl proportion thereof, said copolymer having been esterified with an aliphatic alcohol containing about 14 carbon atoms per molecule, there being at least one alkyl group present in the esterified copolymer having from 8 to 18 carbon atoms in a straight chain.

2. A lubricating composition consisting essentially of a major proportion of a mineral lubricating oil having combined therein from 0.05 to 10% by weight based on the weight of the total composition of a copolymer of maleic anhydride and a mixture of vinyl alkyl ethers having an average number of carbon atoms in the alkyl portion thereof of 13.5, said copolymer having been esterified with an aliphatic alcohol containing about 14 carbon atoms per molecule, there being at least one alkyl group present in the esterified copolymer having from 8 to 18 carbon atoms in a straight chain.

3. A lubricating composition consisting essentially of a major proportion of a mineral lubricating oil having combined therein from 0.05 to 10% by weight based on the weight of the total composition of a copolymer of maleic anhydride and vinyl decyl ether, said copolymer having been esterified with a mixture of aliphatic alcohols having an average number of carbon atoms of 13.5, said mixture of alcohols having been obtained by the hydrogenation of coconut oil.

4. A lubricating composition consisting essentially of a major proportion of a mineral lubricating oil having combined therein from 0.05 to 10% by weight based on the weight of the total composition of a copolymer of maleic anhydride and vinyl tetradecyl ether, said copolymer having been esterified with a mixture of aliphatic alcohols having an average number of carbon atoms of 13.5, said mixture of alcohols having been obtained by the hydrogenation of coconut oil.

5. A mineral lubricating oil containing a minor proportion, sufficient to lower the pour point of said oil of an esterified copolymer formed by copolymerizing an alkyl vinyl ether, the alkyl portion of said ether having been derived from a mixture of primary, normal, saturated, aliphatic alcohols having an average of about 14 carbon atoms per molecule, with an alpha, beta-unsaturated polycarboxylic acid material selected from the group consisting of maleic acid and maleic anhydride and esterifying the copolymer thus obtained with a mixture of primary, normal, saturated aliphatic alcohols containing an average of about 14 carbon atoms per molecule.

References Cited in the file of this patent

UNITED STATES PATENTS

| Number | Name | Date |
|---|---|---|
| 2,047,398 | Voss | July 14, 1936 |
| 2,168,535 | Nusslein | Aug. 8, 1939 |
| 2,188,882 | Clocker | Jan. 30, 1940 |
| 2,342,113 | Blair | Feb. 22, 1944 |
| 2,366,517 | Gleason | Jan. 2, 1945 |
| 2,370,943 | Dietrich | Mar. 6, 1945 |
| 2,380,304 | Gleason | July 10, 1945 |
| 2,444,328 | Blair | June 29, 1948 |

FOREIGN PATENTS

| Number | Country | Date |
|---|---|---|
| 774,437 | France | Sept. 17, 1934 |